April 9, 1946.  M. K. CUMMING ET AL  2,398,210
PACKING AND METHOD OF MAKING THE SAME
Filed March 23, 1944

INVENTORS
MILTON K. CUMMING
WILBUR VAN TINE.
BY Virgil C. Kline
ATTORNEY

Patented Apr. 9, 1946

2,398,210

UNITED STATES PATENT OFFICE 2,398,210

PACKING AND METHOD OF MAKING THE SAME

Milton K. Cumming, Bronxville, N. Y., and Wilbur Van Tine, Raritan, N. J., assignors to Johns-Manville Corporation, New York, N. Y., a corporation of New York Application March 23, 1944, Serial No. 527,794

10 Claims. (Cl. 288—15)

The present invention relates to improved packings and is particularly concerned with improvements in packings embodying knitted, metal fabric as a primary constituent.

Packings of this type as heretofore made, comprise one or more cords formed of resilient, knitted, metal fabric composed of relatively thin, flat, narrow, metal ribbons. The knitted mesh, suitably of tubular form, is compacted into a cord, preferably by twisting, and a plurality of the cords are braided or otherwise assembled together to form the packing. The packing preferably contains a sealing media or filler and, where the packing is not to be subjected to excessive temperatures, a lubricant such as oil, graphite, grease or the like.

Packings of the above type have proved to be definitely superior to conventional packings in many uses, as they retain their resilient characteristics substantially indefinitely under the severest conditions. Also, by suitable selection of the metal, they are substantially unaffected by acid and other corrosive fumes or liquids.

The instant invention has for its principal object, the provision of an improved packing of the above type and, more particularly, an object is the provision of such packing which will provide a more effective seal under relatively high temperatures and pressures. For example, the packing of the instant invention has been used where temperatures of 1500° F. and higher are encountered to effectively seal pressures of 30 to 40 lbs. per square inch without failure for indefinite periods.

Briefly stated, the instant invention resides in a packing comprising twisted or otherwise compacted cords of knitted, metal mesh of the type referred to above, the cords, however, embracing or surrounding a heat-resistant, fibrous material, preferably asbestos rovings or wicking. The fibrous cores expand into the fabric mesh during the fabricating process and in the use of the packing, seal the pores of the mesh against passage of gas or other fluid without adversely affecting the resilient and heat-resistant characteristics of the packing.

A further object of the invention is the provision of a method of making a packing of the type described.

Our invention will be more fully understood and further objects and advantages thereof will become apparent when reference is made to the more detailed description of the preferred embodiment thereof which is to follow and to the accompanying drawing in which.

Figure 1:
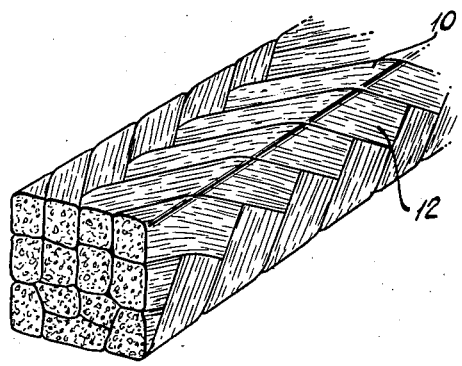
Fig. 1 is a perspective view of a packing in accordance with the invention.
Figure 2:
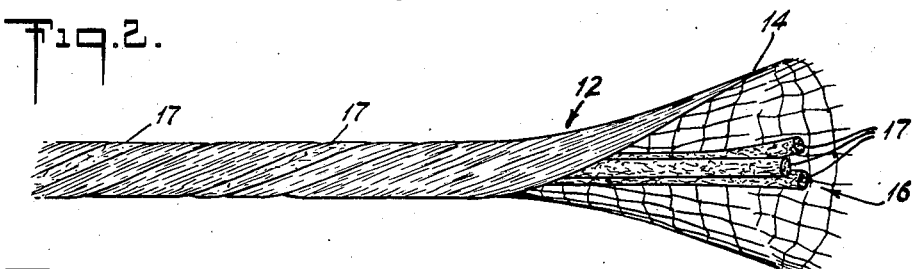
Fig. 2 is a diagrammatic view on an enlarged scale illustrating the individual cords of the packing and their manner of fabrication.

Referring now to the drawing, and particularly Figs. 1 and 2, there is shown a packing and a packing element respectively, embodying the instant invention. The packing 10 of Fig. 1 comprises a plurality of interrelated cords 12, formed basically of a knitted, metal mesh fabric. The several cords are interrelated or associated together in any suitable manner, preferably by braiding as illustrated, and the braid is molded or compressed into the desired cross-sectional configuration of the completed packing.

Cords 12, illustrated particularly in Fig. 2, comprise strips of metal mesh fabric 14, compacted, as by twisting, around a fibrous core 16. Fabric 14 is knitted of thin, flat, narrow, metallic strands of preferably a relatively hard, corrosion-resistant metal or metal alloy such as copper, aluminum or nickel steel. In certain instances a softer metal or metal alloy may be employed, such as lead, babbitt, and the like but, where a relatively high degree of resilience is desired in the finished packing as is generally the case, the harder metals are required. A preferred material is an alloy such as "Inconel" or Monel metal. The individual, flat, metal strands are fabricated on knitting equipment of any suitable type, preferably a circular knitting machine, to provide a tubular fabric or mesh as shown in Fig. 2.

Core 16 is formed of a heat-resistant, fibrous material such as asbestos. The core may be but a single strand, but as indicated in Fig. 2, a plurality of strands 17, slightly twisted together, is preferred. Asbestos rovings or wickings of such size and in such number as to comprise approximately 40% by weight of the packing have been found to be satisfactory for the core where the packing is to be subjected to severe use.

Figure 3:
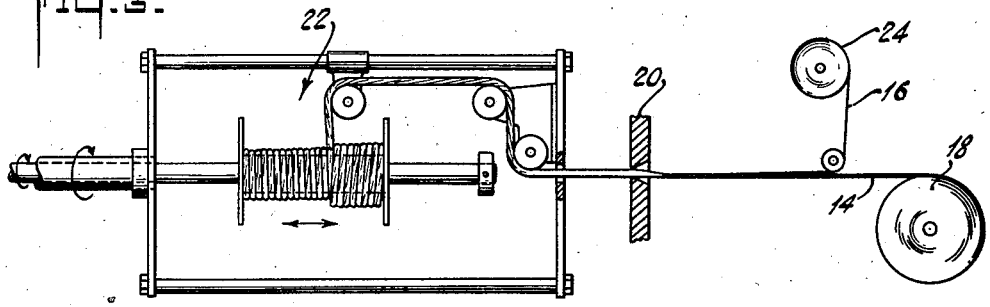
Fig. 3 is a diagrammatic view depicting an apparatus employed in fabricating the cord of Fig. 2.

In the manufacture of a packing in accordance with the invention, the knitted mesh, preferably of tubular form as previously pointed out, is flattened and fed from a supply thereof as indicated at 18 in Fig. 3, through a condensing die 20 and from thence to a twisting device 22 of any conventional construction, whereby the fabric is compacted or twisted into cord form. Prior to the entry of the flattened fabric into the condensing die, core 16, composed of the asbestos strand or strands, is delivered from a supply 24 on to the flattened fabric 14 and carried therewith through the condensing die and to twister 22, whereby the fabric is twisted or compacted around core 16. A plurality of cords 12, produced in this manner, are associated in a suitable manner to form the packing, preferably by braiding, and the braid is subjected to a pressing or molding action to achieve the desired packing shape, as for example, that shown in Fig. 1.

The packing described above operates successfully at temperatures in excess of those heretofore considered the upper limits for asbestos materials, due to the fact that the metal mesh serves to confine and support the fibrous cores. The asbestos cores perform a complete sealing function permitting the packing to be employed under severe temperature conditions without leakage as, for example, in the exhaust systems of high altitude, high speed airplane motors.

Figure 4:
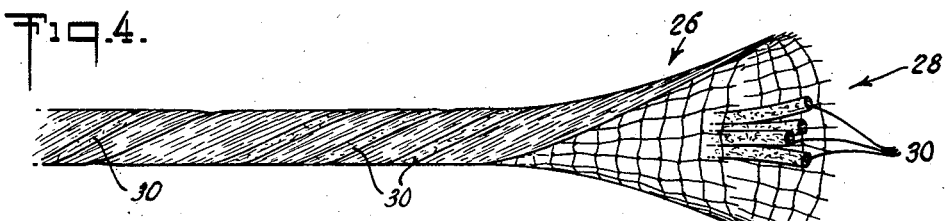
Fig. 4 is a view similar to Fig. 2, illustrating a modified form of the cord.

Referring now to Fig. 4, a somewhat modified form of the cord is indicated by reference character 26. In this instance the core 28, comprising one or more asbestos rovings or wickings 30, the rovings preferably being in parallel relationship, as shown in the figure, are fed as a core strand or strands into the knitting machine, and the tubular, metal mesh is knitted therearound. As the tube leaves the knitting machine, it is flattened and preferably crimped into the core strands to maintain the latter in their parallel position. In this case the product of the knitting machine, comprising the fibrous core and the knitted, metal sheath, may be directly compacted as by twisting, to form the cord 26, the apparatus shown in Fig. 3 being suitable for this purpose.

Having thus described our invention in rather full detail, it will be understood that these details need not be strictly adhered to but that various changes and modifications may suggest themselves to one skilled in the art, all falling within the scope of the invention as defined by the subjoined claims.

What we claim is:

1. A packing comprising a plurality of interrelated cords, each of said cords being formed of a resilient, knitted, metal fabric compacted into cord form and including a fibrous sealing material embraced by said compacted fabric.

2. A packing comprising a plurality of interrelated cords, each of said cords being formed of a resilient, knitted, metal fabric compacted into cord form around a fibrous asbestos core strand.

3. A resilient packing comprising a plurality of interbraided cords, each of said cords including a knitted fabric composed of corrosion-resistant, thin, narrow, metal ribbons, said fabric being compacted into cord form around a fibrous core.

4. A resilient packing comprising a plurality of interbraided cords, each of said cords comprising a knitted fabric composed of corrosion-resistant, narrow, metal ribbons twisted into cord form around an asbestos core strand.

5. A packing comprising a plurality of interbraided cords, each of said cords being formed of a resilient, knitted, metal fabric twisted around a fibrous asbestos core.

6. A packing comprising a plurality of interbraided cords, each of said cords being formed of a tubular, knitted, compacted, resilient, metal fabric with an asbestos core strand within said tube.

7. A method of making a packing comprising feeding a flattened strip of tubular knitted metal fabric composed of narrow, flat strands, feeding a fibrous core strand on to said strip, twisting said strip around said core strand to form a cord, and combining a plurality of said cords into a packing.

8. A method of making a packing comprising feeding a flattened strip of tubular, knitted fabric composed of narrow, flat strands, feeding an asbestos core strand on to said strip, twisting said strip around said core to form a compacted cord, and braiding a plurality of said cords together.

9. A method of making a packing comprising compacting a tubular, knitted, metal fabric around a fibrous core to form a cord, and combining a plurality of said cords into a packing.

10. A method of making a packing comprising knitting a tubular fabric composed of narrow, flat, metal strands around an asbestos core strand, flattening said tubular fabric to embrace said strand, twisting said fabric with said core therein into cord form, and combining a plurality of said cords into a packing.

MILTON K. CUMMING.
WILBUR VAN TINE.